US006302429B1

(12) United States Patent
Friedrich

(10) Patent No.: US 6,302,429 B1
(45) Date of Patent: *Oct. 16, 2001

(54) CONVERTIBLE WHEELCHAIR

(75) Inventor: Paul Friedrich, Ventura, CA (US)

(73) Assignee: DA International, LTD, Hewlett, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/442,058

(22) Filed: Nov. 16, 1999

(51) Int. Cl.[7] .............................. B62M 1/14
(52) U.S. Cl. .............................. 280/649; 280/250.1; 280/650
(58) Field of Search .............................. 280/250.1, 647, 280/649, 650

(56) References Cited

U.S. PATENT DOCUMENTS

| | | | | |
|---|---|---|---|---|
| D. 344,702 | | 3/1994 | Robertson et al. . | |
| 2,647,000 | | 7/1953 | Colley . | |
| 3,333,873 | | 8/1967 | Triplett . | |
| 3,353,852 | | 11/1967 | Wood . | |
| 3,584,890 | | 6/1971 | Presty . | |
| 3,864,051 | | 2/1975 | Reid . | |
| 3,985,460 | | 10/1976 | Piper et al. . | |
| 4,013,372 | | 3/1977 | Lay et al. . | |
| 4,017,199 | | 4/1977 | Strassle . | |
| 4,039,263 | | 8/1977 | Bassler . | |
| 4,294,561 | | 10/1981 | Chapman et al. . | |
| 4,355,919 | | 10/1982 | Lievonen . | |
| 4,386,870 | | 6/1983 | Baroody . | |
| 4,405,142 | | 9/1983 | Whetstine . | |
| 4,484,832 | | 11/1984 | Weissenburger . | |
| 4,490,064 | | 12/1984 | Ducharme . | |
| 4,595,212 | | 6/1986 | Haury et al. . | |
| 4,603,996 | | 8/1986 | Chen . | |
| 4,650,201 | | 3/1987 | Hartwell . | |
| 4,682,783 | * | 7/1987 | Kuschall | 280/250.1 |
| 4,684,171 | | 8/1987 | Roy et al. . | |
| 4,695,179 | | 9/1987 | Schnell . | |
| 4,752,979 | | 6/1988 | Goacher, Sr. . | |
| 4,784,511 | | 11/1988 | Greene . | |
| 4,810,144 | | 3/1989 | Martelli . | |
| 4,846,600 | | 7/1989 | Strand . | |
| 4,921,370 | | 5/1990 | Handler et al. . | |
| 4,923,322 | | 5/1990 | Burg . | |
| 4,981,305 | | 1/1991 | Lockard et al. . | |
| 5,011,175 | | 4/1991 | Nicholson et al. . | |
| 5,149,120 | * | 9/1992 | Halliday | 280/649 |
| 5,186,480 | * | 2/1993 | Morgan et al. | 280/250.1 |
| 5,188,383 | * | 2/1993 | Thompson | 280/250.1 |
| 5,253,888 | | 10/1993 | Friedrich . | |
| 5,284,350 | * | 2/1994 | Geiger et al. | 280/250.1 |
| 5,294,141 | | 3/1994 | Mentessi et al. . | |
| 5,308,147 | | 5/1994 | Tseng . | |
| 5,328,183 | * | 7/1994 | Counts | 280/250.1 |
| 5,360,224 | * | 11/1994 | Geiger et al. | 280/250.1 |
| 5,421,598 | | 6/1995 | Robertson et al. . | |
| 5,496,050 | * | 3/1996 | Geiger et al. | 280/250.1 |
| 5,560,635 | | 10/1996 | Roy . | |
| 5,609,348 | | 3/1997 | Galumbeck . | |
| 5,667,235 | | 9/1997 | Pearce et al. . | |
| 5,727,802 | | 3/1998 | Garven, Jr. et al. . | |
| 5,743,545 | | 4/1998 | Kunze et al. . | |
| 5,857,688 | * | 1/1999 | Swearingen | 280/250.1 |
| 5,915,709 | * | 6/1999 | Radjenovic et al. | 280/250.1 |
| 6,027,132 | * | 2/2000 | Robinson et al. | 280/250.1 |
| 6,050,582 | * | 4/2000 | Horacek | 280/250.1 |

* cited by examiner

*Primary Examiner*—Brian L. Johnson
*Assistant Examiner*—Matt Luby
(74) *Attorney, Agent, or Firm*—Lackenbach Siegel

(57) ABSTRACT

A simple, durable, lightweight, economical wheelchair is disclosed that offers full convertibility from rigid frame to folding and vice versa, without sacrificing advantages of either design. In addition, it allows conversion to sports, companion, pediatric, front wheel drive, etc. as well as customizing to suit the end user's needs.

6 Claims, 12 Drawing Sheets

REAR VIEW

REAR VIEW

SIDE VIEW

TOP VIEW
(SEAT UPHOLSTERY REMOVED FOR CLARITY)

REAR VIEW

SIDE VIEW
(WITH OPTIONAL FOLDING BACK)

TOP VIEW
(SEAT UPHOLSTERY REMOVED FOR CLARITY)

CONVERTIBLE WHEELCHAIR

BACKGROUND OF THE INVENTION

1. Field of the Invention

The invention relates generally to wheelchairs and, more specifically, to convertible wheelchairs. All frame components are designed to accept parts for both the folding and rigid frame wheelchairs. Tubular components are designed to be easily attached to other members with the special connector fittings allowing for further conversion to other desirable designs.

2. Description of the Prior Art

Two different methods have been used in the design and production of manual wheelchairs. The most common is the folding cross brace wheelchair. This design utilizes a welded cross brace mechanism, allowing the wheelchair to fold similar to a director's chair (from side to side). The main advantage of this method is that the wheelchair can be easily folded by most users. The disadvantage of this design is low energy efficiency due to its loose construction since a part of the energy used to propel the wheelchair is transferred to the frame rather than the wheels.

A second popular design is the rigid frame wheelchair. In this design the cross brace mechanism is replaced with tubular crossbars welded to the side frames of the wheelchair. The advantage of this design is its energy efficiency. However, this wheelchair does not fold as compactly as the cross brace chair for easy travel, storage or transportation.

The above-described designs have a problem in common—welded construction. The welded construction makes it extremely difficult, if not impossible, to adapt the wheelchair to the end user's changing needs and environment. Conversion from rigid frame to folding wheelchair is virtually impossible. In addition, welding creates a heat-affected zone weakening the frame tube around the welded joint, which is a main cause for structural failure in wheelchairs.

For the majority of wheelchair users it is necessary to have both wheelchairs—the rigid frame and the folding one. The folding wheelchair is more convenient for travel and indoor use, whereas the chair must be folded and stored. The rigid wheelchair is better suited for outdoors and a more active lifestyle. Unfortunately, it is not economically feasible for most users to own both wheelchairs.

Some wheelchair manufacturers build both folding and rigid frame chairs. There is a number of folding wheelchairs that use the conventional crossbrace design. Rigid chairs exist that are of a modular design and can change the width of the wheelchair with little difficulty. There is a design that converts from a user propelled to an assistant propelled wheelchair (U.S. Pat. No. 5,294,141). There is also a wheelchair that converts the riding position from the standard seating position to a recumbent position (U.S. Pat. No. 5,011,175). There is a weld-free folding wheelchair which folds in a non-conventional manner but is not convertible (U.S. Pat. No. 4,682,783). Another wheelchair design appears to be of a weld-free design that allows the wheelchair to adjust to different needs by use of special shaped bars and plates but is not a convertible wheelchair (U.S. Pat. No. 5,743,545). There are several U.S. patents that claim the chair to be modular, allowing for different components to be used to build the chair to the user's needs. Among these is a rigid frame wheelchair (U.S. Pat. No. 5,421,598), but again this wheelchair does not convert to folding. There are no wheelchairs known to exist at this time that can fully convert from a rigid frame to folding frame.

In U.S. Pat. No. 5,253,888, issued to the assignee of the subject invention, a rigid frame weld-free wheelchair is disclosed that utilizes a series of special clamping members for clamping tubes to each other. However, such weld-free construction had some disadvantages. A series of specially designed clamps had to be utilized which were not universal to all designs, making further conversion and design changes virtually impossible. Also, by virtue of the clamp designs, numerous bolts were required that were clearly visible and detracted from the appearance of the wheelchair.

It is possible for one wheelchair to have all of the advantages of both the folding and the rigid chairs while eliminating the disadvantages of each.

SUMMARY OF THE INVENTION

An object of this invention is to provide a convertible wheelchair that does not have the disadvantages inherent in prior art wheelchairs.

It is an object to provide a convertible wheelchair utilizing standard [???] components which can be used for both folding and rigid frame wheelchair design.

It is another object of this invention to provide a durable, lightweight and economical wheelchair that can be quickly and easily converted by a layman from a folding frame to a rigid frame and vice versa.

It is still another object of the invention to provide a wheelchair that can be easily converted to a sport type wheelchair.

It is yet another object of the invention to provide a wheelchair that can be easily converted to a companion chair.

It is a further object of the invention to provide a wheelchair that can be easily converted to a front wheel drive wheelchair.

It is still a further object of the invention to provide a wheelchair that can be easily converted to a pediatric wheelchair.

It is yet a further object of the invention to provide a wheelchair that can be easily converted to a hand cycle with optional attachment.

It is an additional object of the invention to provide a wheelchair that can be easily converted to a lever driven wheelchair with optional attachment.

It is still an additional object to provide convertible wheelchairs that can be converted with the use of simple tools.

In order to achieve the above objects of this invention, as well as others that will become apparent hereinafter, the convertible wheelchair of the present invention has a pair of like side frame assemblies spaced from each other and each including a generally horizontal seat tube and a generally horizontal bottom tube below said seat tube. Each of these seat and bottom tubes has front and rear ends. A generally vertical backrest tube has a lower end proximate to said rear ends of said seat and bottom tubes and an upper end extending upwardly of said set tube and forming handgrips.

A caster assembly for each side frame assembly carries a caster wheel and has a generally upwardly extending shaft portion. Connecting means is provided for rigidly clamping respective rear ends of the seat and bottom tubes and the lower ends of the backrest tubes, for rigidly clamping the respective front ends of the seat and bottom tubes and caster assembly shaft portion, and for rigidly connecting said conversion means to frame assemblies. A footrest means is secured to the seat tube, and a conversion means selectively converts the connection between the side frame assemblies to convert the wheelchair from a folding wheelchair to a rigid wheelchair and vice versa.

Conversion means may include pivotally connected elongate means having ends pivotably connectable to the side frame assemblies for selectively replacing the transverse tube means and for permitting the side frame assemblies to move from the width position of the wheelchair to proximate positions in the collapse condition of the wheelchair, or a kit consisting of at least two transverse members including at least two elongate rigid tubes having a length substantially corresponding to the normal operative width of the wheelchair and at least one set of pivotably connected members that can pivot relative to each other.

The convertible wheelchair frame is made up of left and right side frame assemblies, two push handle assemblies, upholstery and removable folding or rigid crossbars (all assemblies are weld-free). Specially designed fittings are used to provide for a secure fastening internally between mating tubes. These fittings are used throughout all assemblies where two or more tubes mate up. These fittings shall be referred to as connector fittings throughout this text. Each side frame assembly is provided with mounting holes to assemble the wheelchair as either folding or rigid. The folding crossbar assemblies have T-fittings at the lower end which are a sliding fit to the lower side frame assembly tubes. At the top of the crossbars are seat tubes held in place perpendicular to the crossbar by the connector fittings. Each seat tube is assembled with a multi position insert that is used to attach the seat tube to the crossbar and to assemble the seat upholstery. There are holes in the crossbars near the center. These holes are the location where a pair of crossbars are bolted together and act as the pivot point when folding. These crossbars are slid onto the lower frame tube and held in place with retaining rings fastened through holes in the tube. This maintains proper horizontal position. There are also holes near the top of the crossbars, these holes are fastened to links which pivot on the side frame assemblies. The links hold the wheelchair frame assemblies parallel when the chair is in both the open (riding) and folding (storage) positions. When the wheelchair is in the open (riding) position, the seat tubes nest into saddles fastened to each side frame assembly. This nesting along with the tension of the upholstery creates a solid box frame giving the chair the feel and performance associated with rigid frame wheelchairs.

Conversion to a rigid frame type wheelchair is accomplished by removing the folding crossbars, links, retaining rings and seat upholstery, and installing rigid crossbars. There are two types of rigid crossbars. The lower crossbars are straight tubes. The upper crossbars have a bend at both ends to give clearance at the seat and back upholstery. Each of the rigid crossbars is assembled with the connector fittings. The seat inserts are removed from the seat tubes and inserted into the upper frame tubes of the side frame assemblies. The top rigid cross tubes are attached to each side frame at the appropriate holes with the connector fittings. Inserts are inserted into the lower side frame tubes and the lower crossbars are fastened in place.

Conversion from rigid to folding is done in the reverse order.

The backrest of the wheelchair may be adjusted to varying heights as may be required by the user or to a folding back for the rigid frame version for ease of transportation and storage. Each side frame has an insert in the back at the seat level that is used to fasten the backrest tubes to the frame. Changing heights can be done by removing two fasteners on either side and the back upholstery and replacing with the new backrest tubes and upholstery. To replace the fixed back with a folding back, the back insert is replaced in the frame with the proper insert for folding. The backrest tube is assembled to the folding hinge plates and all to the frame assemblies are assembled. All components are modular, allowing for simple alteration of the seat width and depth and back height.

BRIEF DESCRIPTION OF THE DRAWINGS

The benefits of the construction herein disclosed will become apparent to those skilled in the art from the following detailed description of a presently preferred embodiment, having reference to accompanying drawings wherein.

DESCRIPTION OF PREFERRED EMBODIMENT

Figure 1:
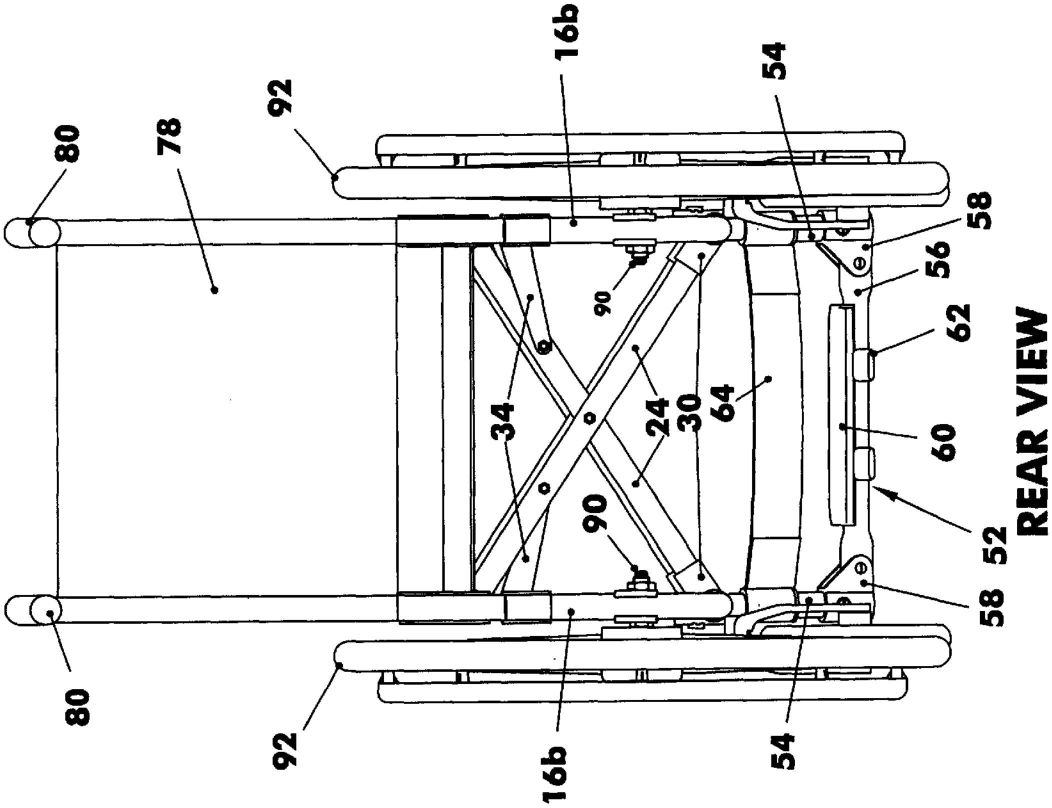
FIG. 1 is a rear elevation view if a wheelchair assembled with folding crossbars in accordance with the invention.
Figure 2:
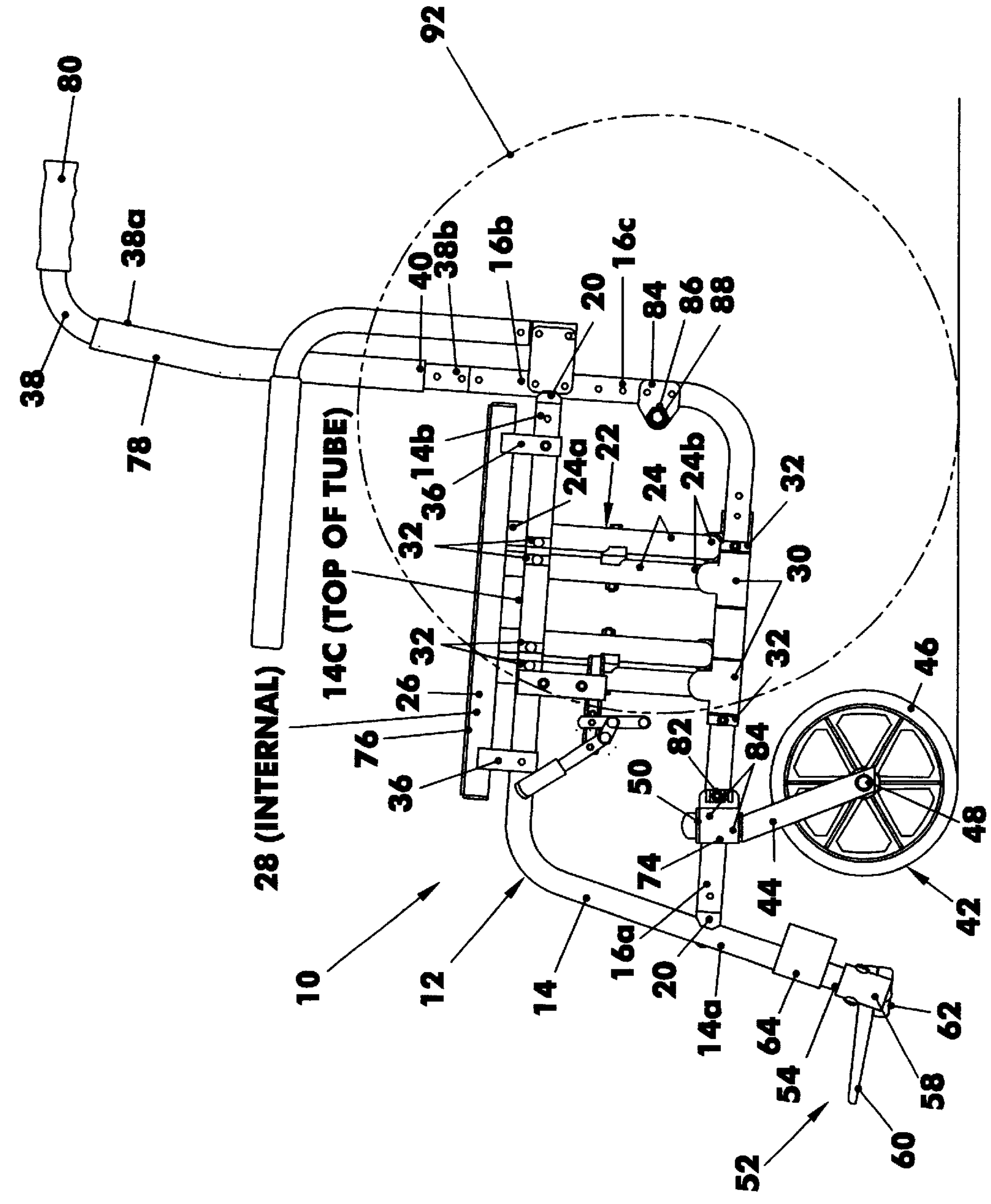
FIG. 2 is a side elevation view of the wheelchair shown in FIG. 1 with folding crossbars, shown with rear wheels removed.
Figure 3:
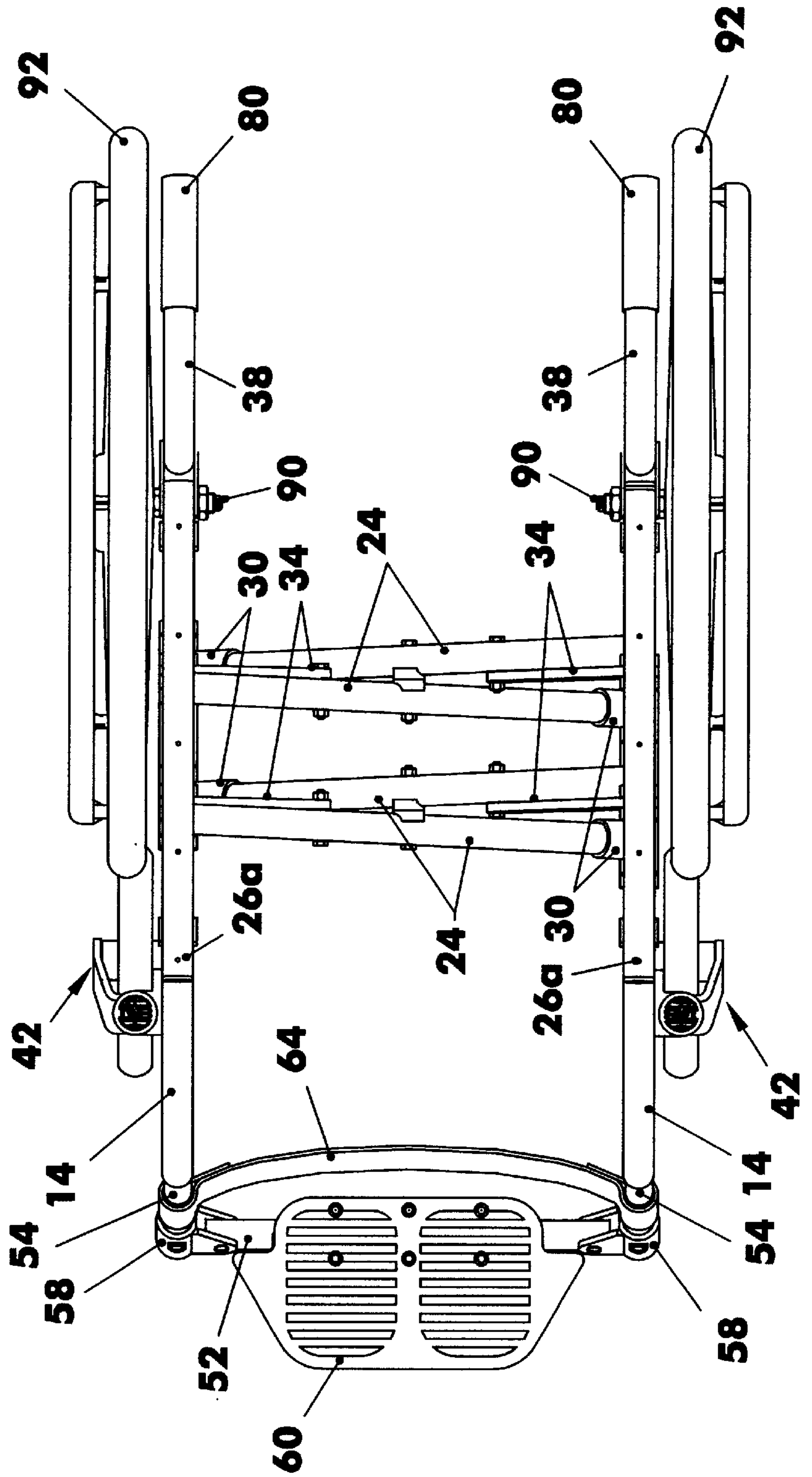
FIG. 3 is a top plan view of the wheelchair shown in FIGS. 1 and 2, with folding crossbars (upholstery removed for clarity)

Referring now to the figures, in which identical or similar parts are designated by the same reference numerals throughout, and first referring to FIGS. 1, 2 and 3, a folding wheelchair in accordance with the present invention is generally designated by the reference numeral 10.

The chair 10 has a pair of like side frame assemblies 12 spaced from each other and including a generally horizontal top tube 14 and a generally horizontal bottom tube 16 below the top tube. The top and bottom tubes have front or distal ends 14*a*, 16*a* and rear or proximal ends 14*b*, 16*b*. Top and bottom tubes are joined at front ends 14*a*, 16*a* using connector fittings 20. The top tube 14 and the bottom tube 16 are secured to each other at front 14*a*, 16*a* and at the rear 14*b*, 16*b* using connector fittings 20. The top tube 14 has a row of holes 14*c* for seat attachment when converted to a rigid frame wheelchair.

The chair also has like crossbar assemblies 22 including an angular crossbar tube 24 and a generally horizontal seat tube 26. There is an insert tube 28 located inside of the seat tube which has threaded holes for multiple connections coinciding with holes in the upper frame 14 and seat tubes 26 which include seat to crossbar and seat upholstery on both the folding and the rigid wheelchair. The seat tube 26 and cross tubes 24 are joined at the upper ends 24*a* of the cross tubes offset from the center of the seat tube 26. The tubes are attached using connector fittings 20. The lower ends 24*b* of the crossbar tubes are inserted into T-fittings 30 with the through hole parallel to the seat tube 26. Each T-fitting has a sliding fit relative to the lower side frame tube 16. The crossbar assemblies 22 are installed over the lower side frame tube 16 in opposing directions (left side with longer portion of seat tube to rear, right side longer portion to front) with seat upholstery holes 26*a* pointing upward. Each crossbar assembly 22 is held in position by retaining rings 32. Crossbar links 34 are installed over the top frame tube 14 and held in place with retaining rings 32. The hole at the small end of the crossbar links 34 are fastened to the opposing crossbar tube 24 at the upper ends 24*a*. The crossbar links 34 maintain a parallel relationship between side frame assemblies when the wheelchair is in either the open or folded position. Seat tube saddles 36 are also assembled to the top frame tube 14. The seat saddles are a snap fit with the seat tubes 26, when the wheelchair is in the open position the seat tubes rest in the saddles and lock the frame rigidly. The seat upholstery 76 is secured to the seat tube with screws at upholstery holes 26*a*.

Each side frame assembly 12 has a back tube stiffening insert 40 secured near the top of the vertical component of the bottom frame tube end 16*b* and protruding upward. Back upholstery 78 is assembled over a pair of push handle tubes 38 and secured with screws near the top of each push handle tube end 38*a*. Push handles are assembled over the top of the back tube stiffener insert 40 abutting the top of the vertical component of the bottom frame tube 16*b*. The assembly is secured with fastener through holes in each tubular member. Hand grips 80 are installed over the top ends of each push handle tube 38.

A caster assembly is generally designated by the reference numeral 42 and includes a downwardly extending open fork member 44 that receives and supports a caster wheel 46 by means of a transverse axle 48. Extending upwardly from the fork member 44 is a solid shaft portion 50 rotatably supported about its axis in bearings 84, as will be described below.

Figure 10:
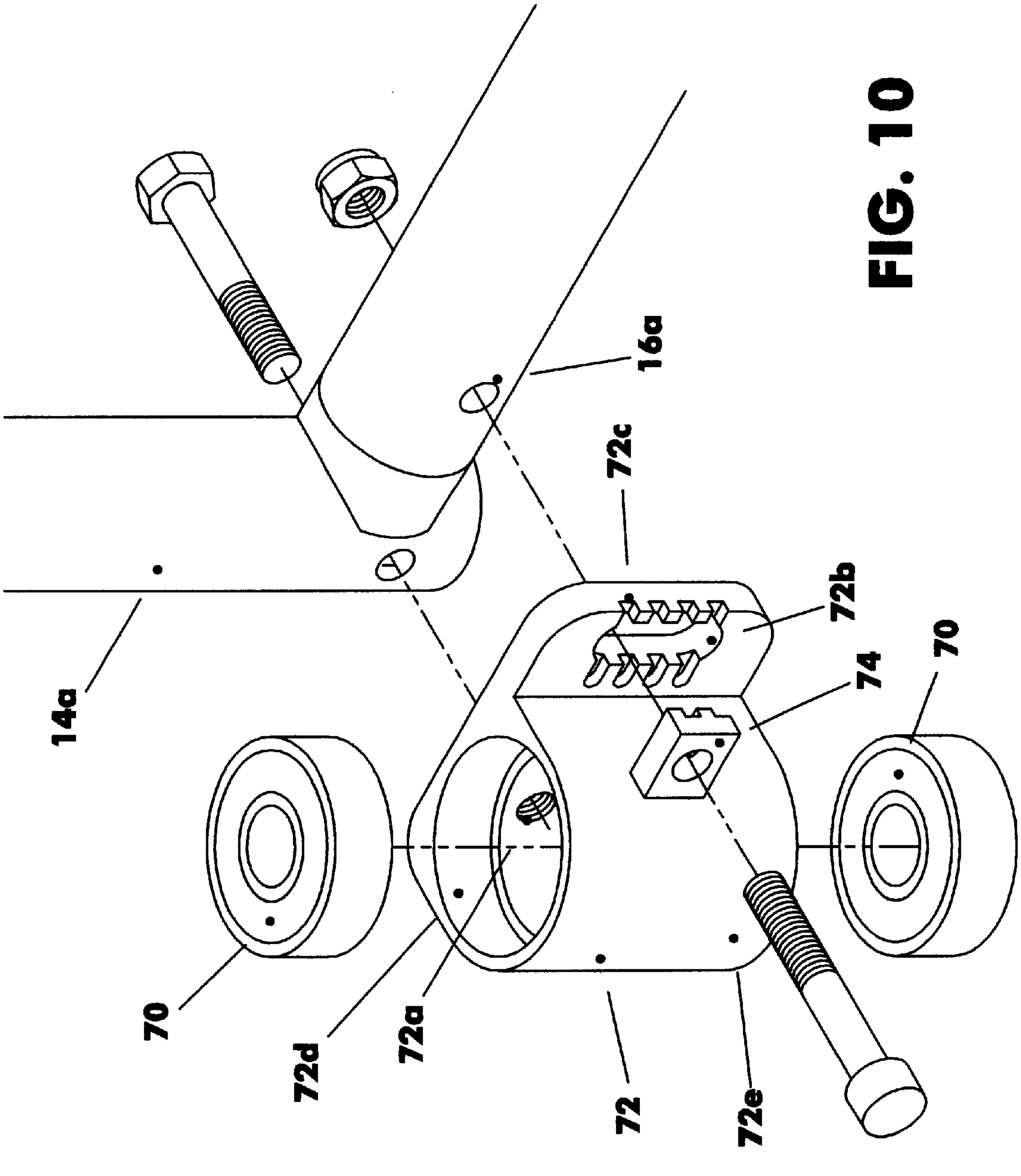
FIG. 10 is a fragmentary exploded perspective view of the caster bearing housing assembly.
Figure 11:
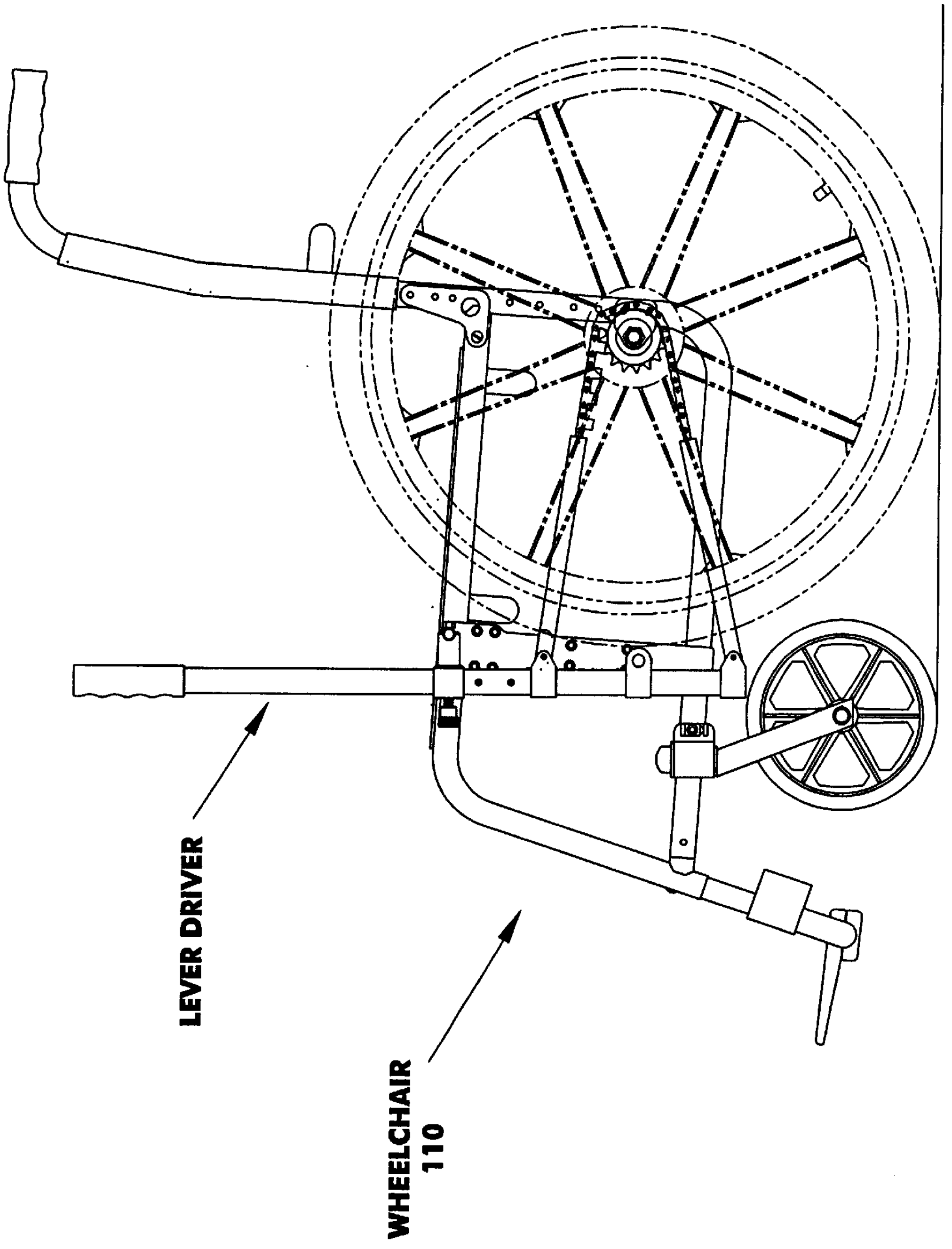
FIG. 11 is a side elevation view of a wheelchair assembled with a lever drive kit.
Figure 12:
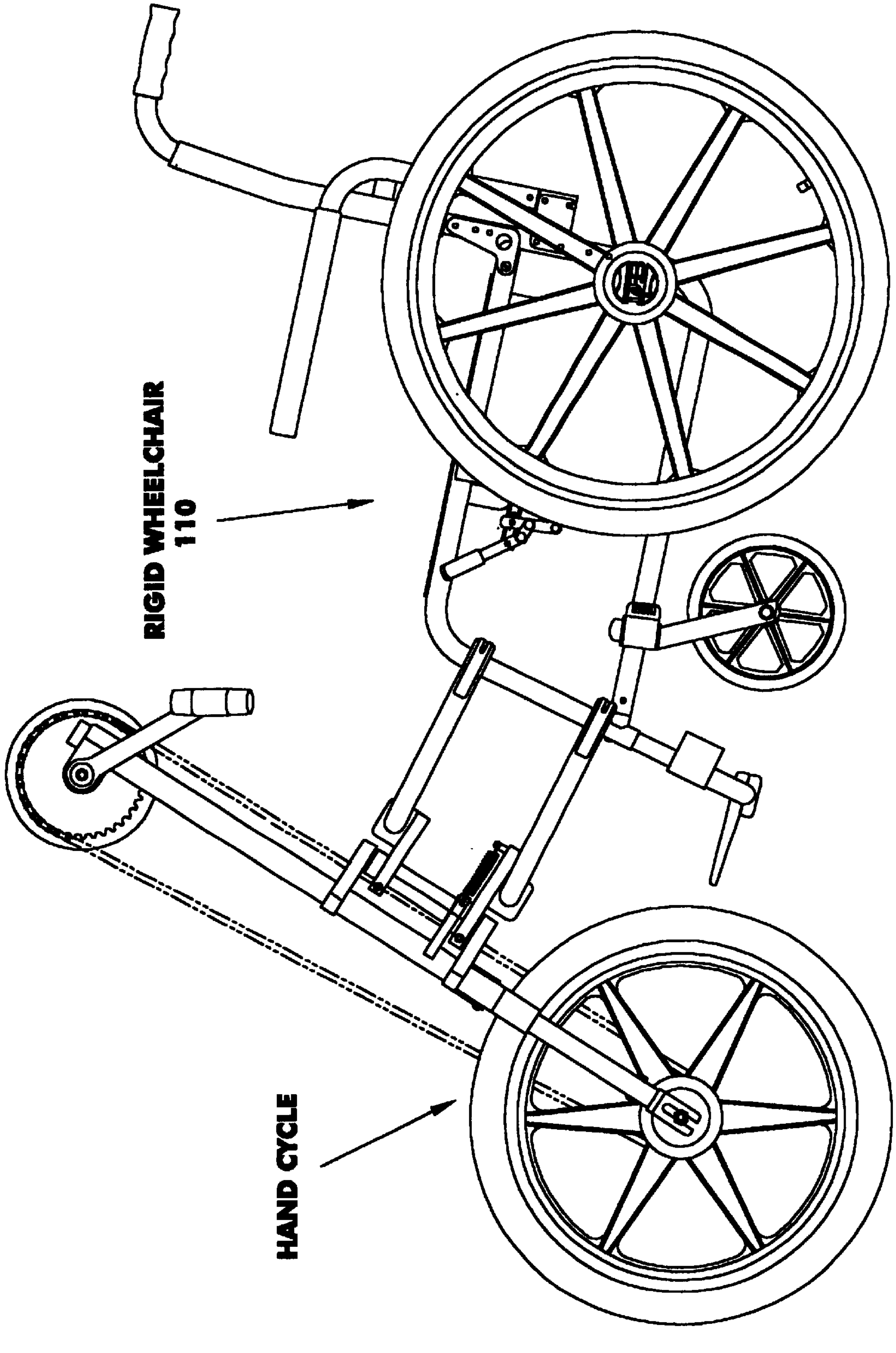
FIG. 12 is a side elevation view of a wheelchair assembled with a hand cycle attachment.

A caster bearing housing 74 (See FIG. 10) is mounted on the bottom frame tube 16 near the front of the tube 14*a*. The caster bearing housing has a threaded hole 74*a* on one end and a slot 74*b* on the opposite side with perpendicular serrations 74*c* crossing the slot. The caster bearing housing is secured to the bottom frame tube through the hole end. The caster bearing housing 74 is free to rotate vertically about the hole. A mating serrated cam 82 is secured over the slot in the caster bearing housing 74 and when properly placed maintains a vertical posture for the caster fork stem 50.

The caster bearing housing 74 has both an upper and lower bearing pocket 74*d*, 74*e* into which radial bearings 84 are pressed.

The vertical solid shaft 50 of the caster assembly 42 is inserted through the bearings 84 pressed into the caster bearing housing 74. The top of the caster stem is threaded to enable securing to the caster bearing housing with a locking nut. The caster assembly 42 is horizontally rotatable about the bearings and stem.

Footrest assembly 52 includes extension tubes 54, which are telescopically received within the front ends 14*a* of the top frame tubes 14, as shown. A transverse tube 56 is secured to one extension tube 54 at its lower end and nests into a fitting 58 on the opposite extension tube. A footrest 60 is secured to the transverse tube 56 (FIGS. 2 and 3) by means of footrest clamps 62. A belt or strap 64 extends between opposing extension tubes 54 and is positioned above the footrest 60 to serve as a foot support and to prevent the legs from slipping rearwardly off of the footrest.

Figure 8B:
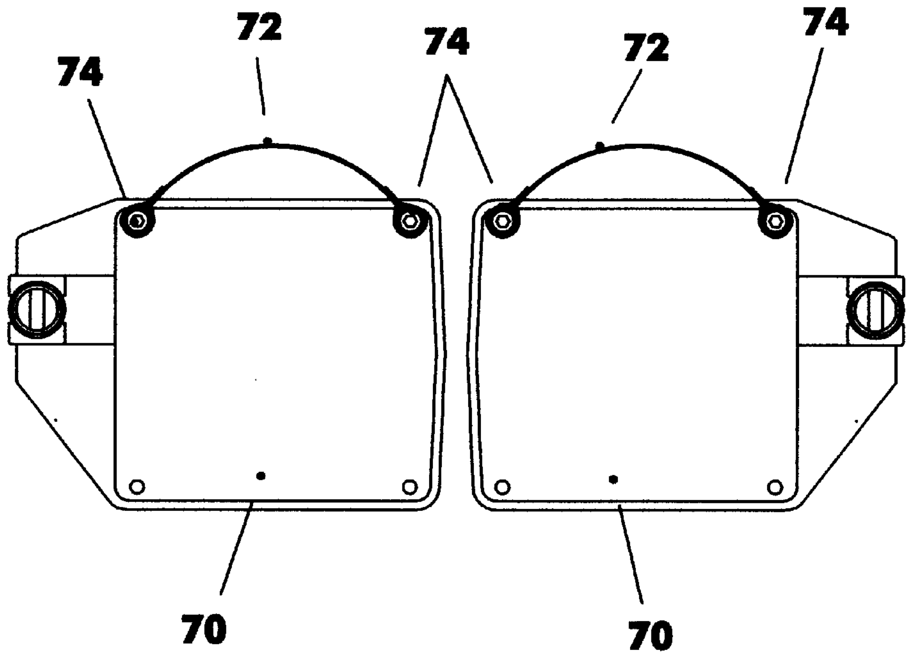
FIGS. 8*a* and 8*b* are side and top elevation views of optional flip up footplate assemblies.
Figure 8A:
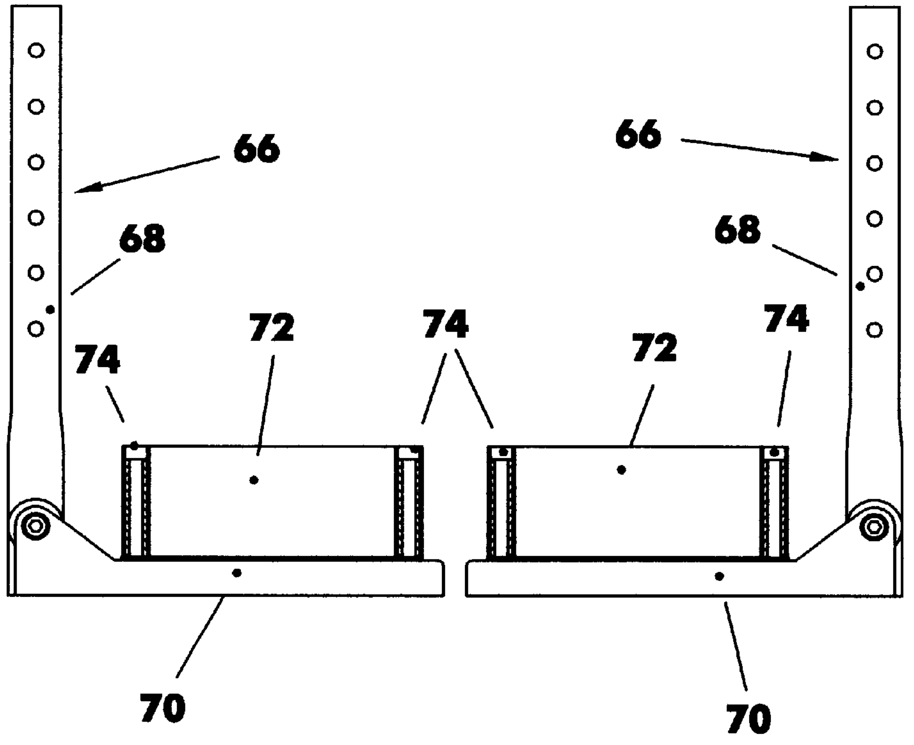

An alternate footrest assembly 66 is shown in FIG. 8. This assembly includes extension tubes 68, which are telescopically received within the front ends 14*a* of the top frame tubes 14, as shown. A flip up footplate 70 is secured to the lower end of the extension tube 68. It is free to rotate upward toward the extension tube. The footplate 70 is limited in rotation downward to a position perpendicular to the extension tube 68. A belt or strap 72 is attached to the inner and outer rear corners of the foot plate 70*a* with a studs 74' (see FIG. 2) and loops around the footrest extension tube 68 positioned above the footplate.

The vertical component of the bottom frame tube 16*c* has a series of holes to which are mounted a pair of rear wheel mounting plates 84' and a wheel plate bushing 86 which is captured between the pair of plates. The position of the axle mounting plates on the bottom frame tube determines the wheelchair rear seat height and seat angle. An axle bushing 88 is installed through the wheel mount plates 84' and wheel plate bushings 86 secured on the back side with a nut. Axles 90 (not shown) support the rear wheels 92 and insert into axle bushing 86. Rear wheels are rotatable vertically about the axles.

Figure 9:
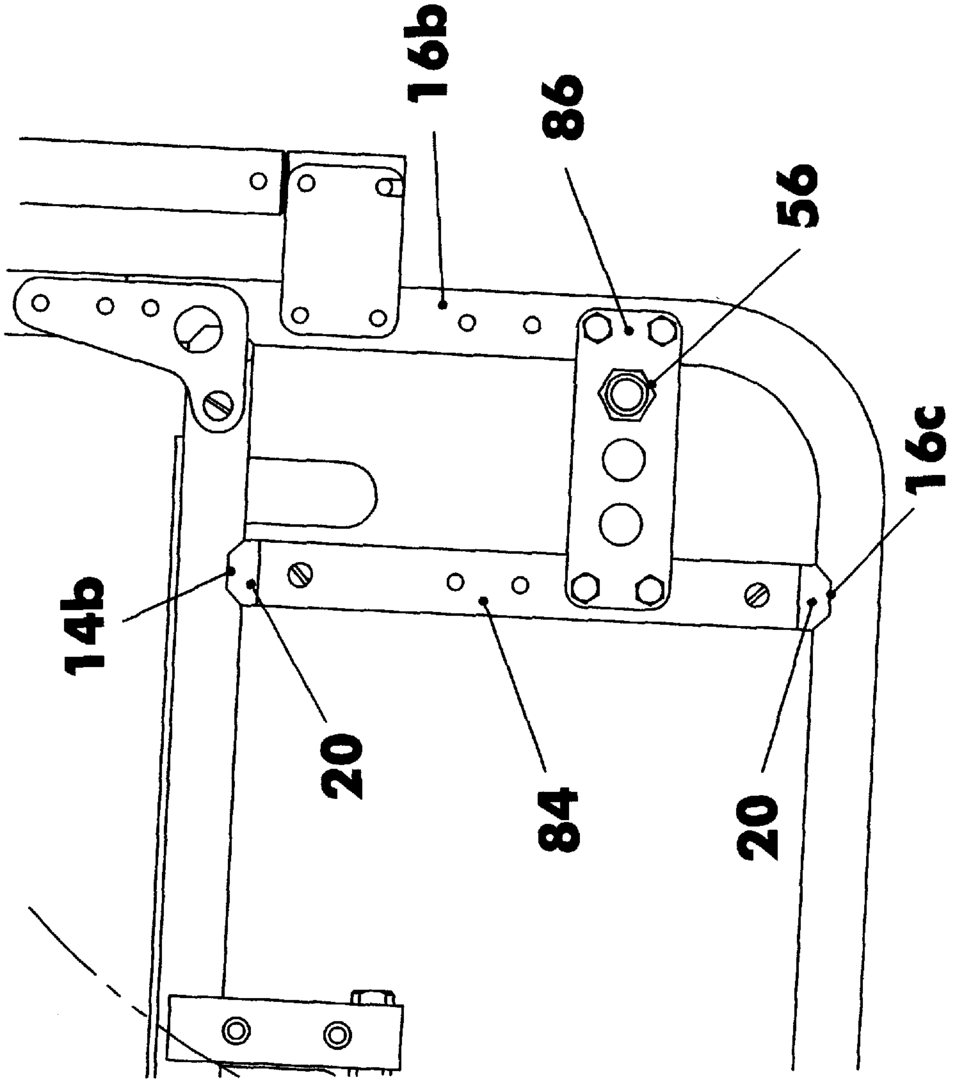
FIG. 9 is an exploded partial side view of a rigid frame wheelchair with optional wheel camber plate.

FIG. 9 shows an optional wheel attachment which consists of an axle plate tube 94 mounted between the top frame tube 14 and the bottom frame tube 16 at 14*b*, 16*c*. The axle plate tube is secured to the frame tubes with connecting fittings 20 at both ends. Spanning between the axle plate tube 94 and the vertical component of the bottom tube 16 is a generally horizontal axle camber plate 86'. The axle camber plate has a series of holes through which the wheel axle bushing 88 is secured. Positioning of the wheel bushing in the holes in the axle camber plate 86' determine the center of gravity of the wheelchair. Angling the lower edge of the axle camber plate 86' outward creates camber to the rear wheels which aids in stability and performance.

Figure 4:
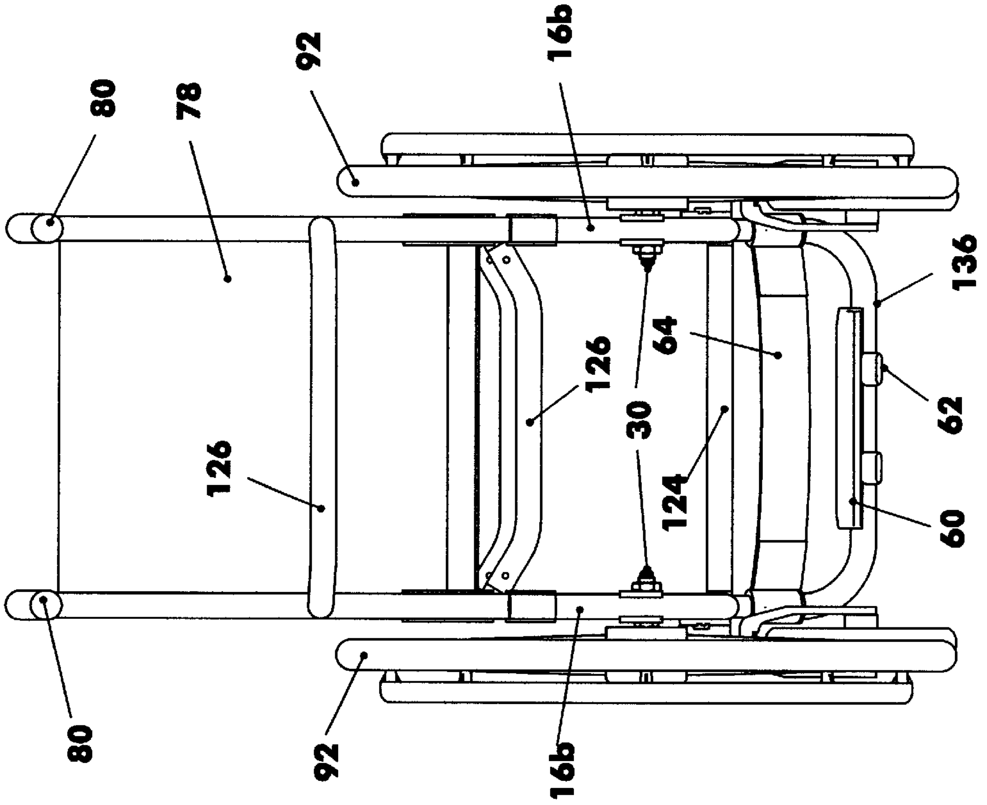
FIG. 4 is a rear elevation view of the wheelchair assembled with rigid cross tubes.
Figure 5:
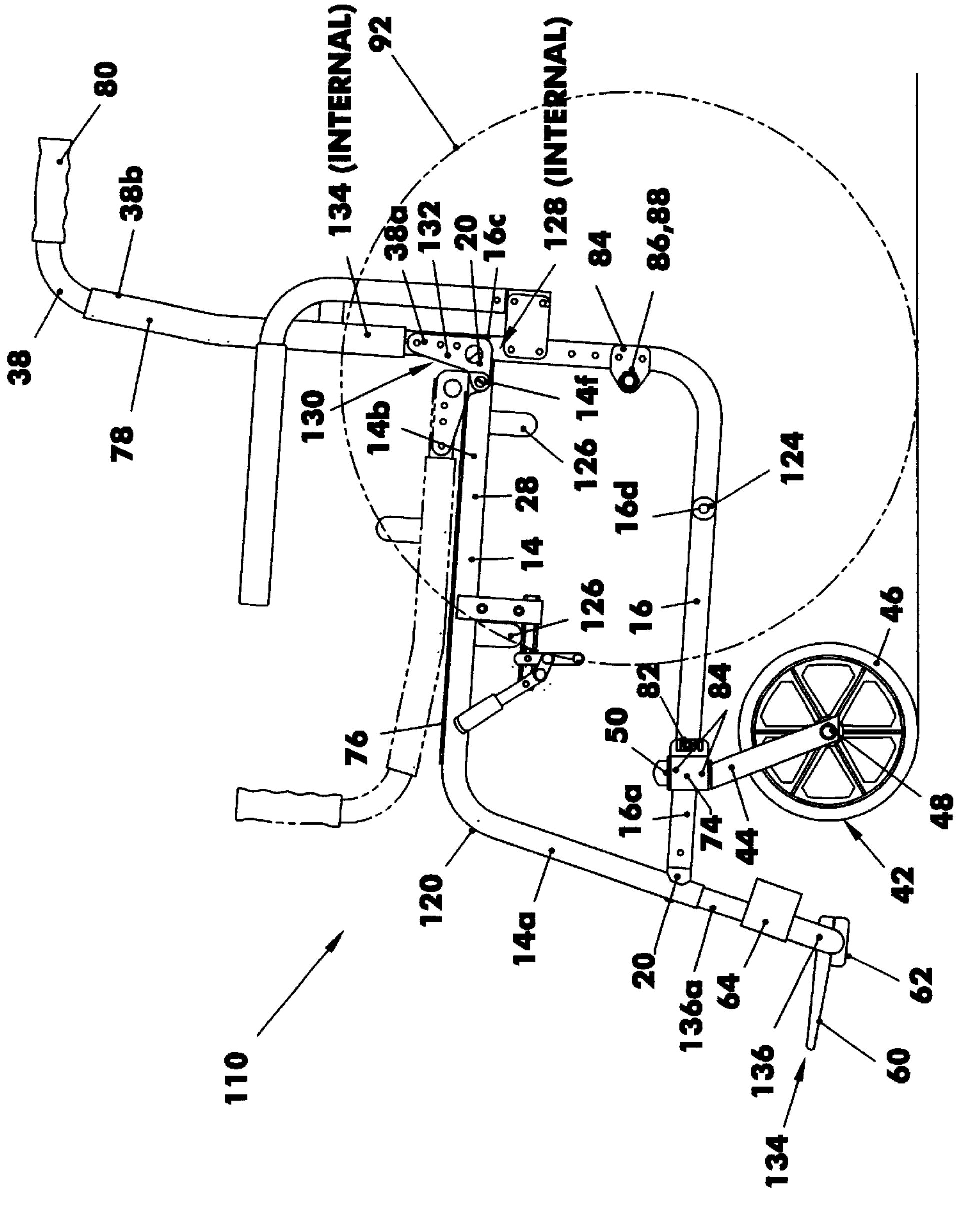
FIG. 5 is a side elevation view of the wheelchair shown in FIG. 4 assembled with rigid cross tubes (upholstery removed for clarity)
Figure 6:
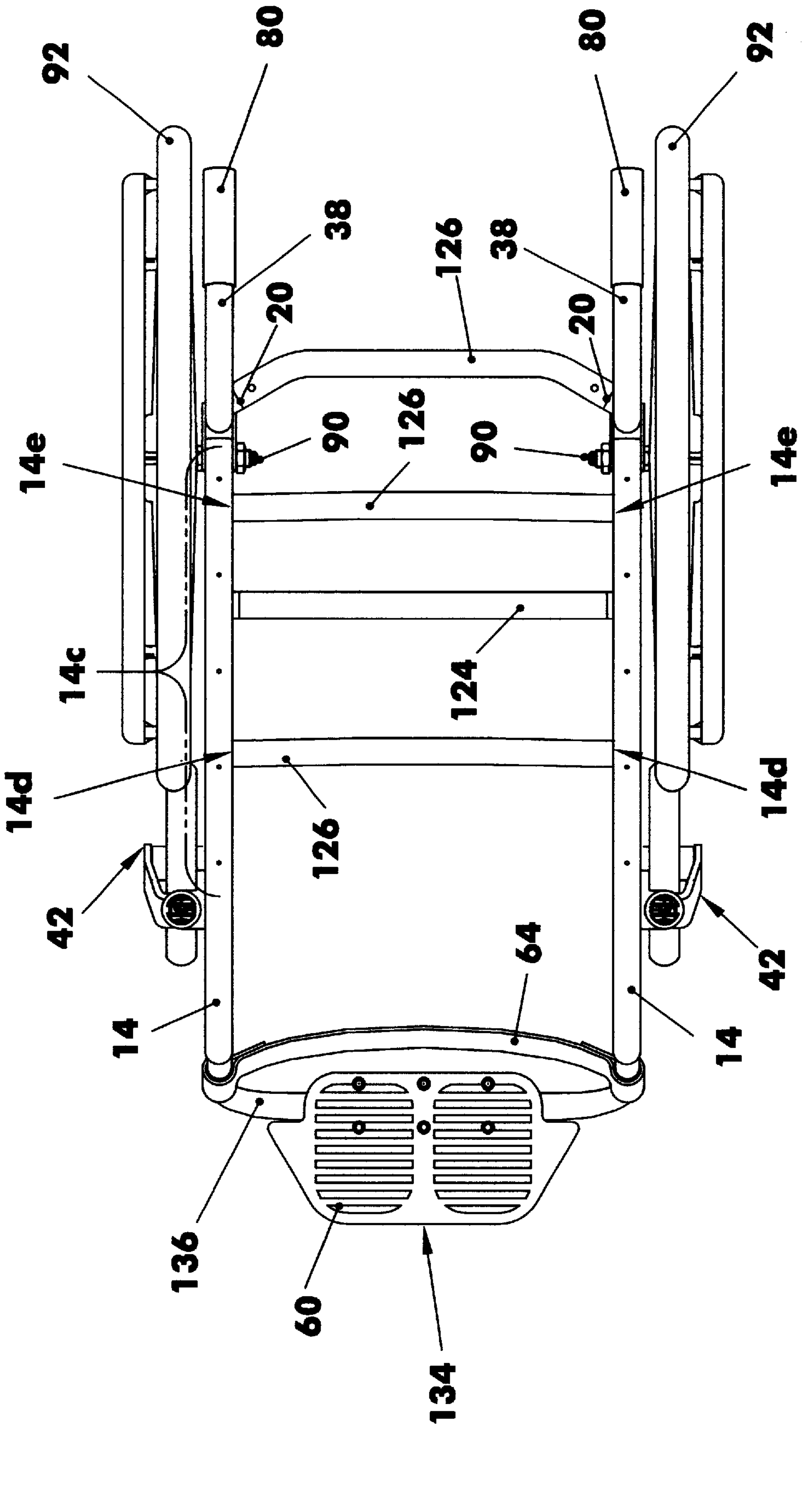
FIG. 6 is a top plan view of the wheelchair shown in FIGS. 4 and 5 assembled with rigid cross tubes (upholstery removed for clarity)
Figure 7:
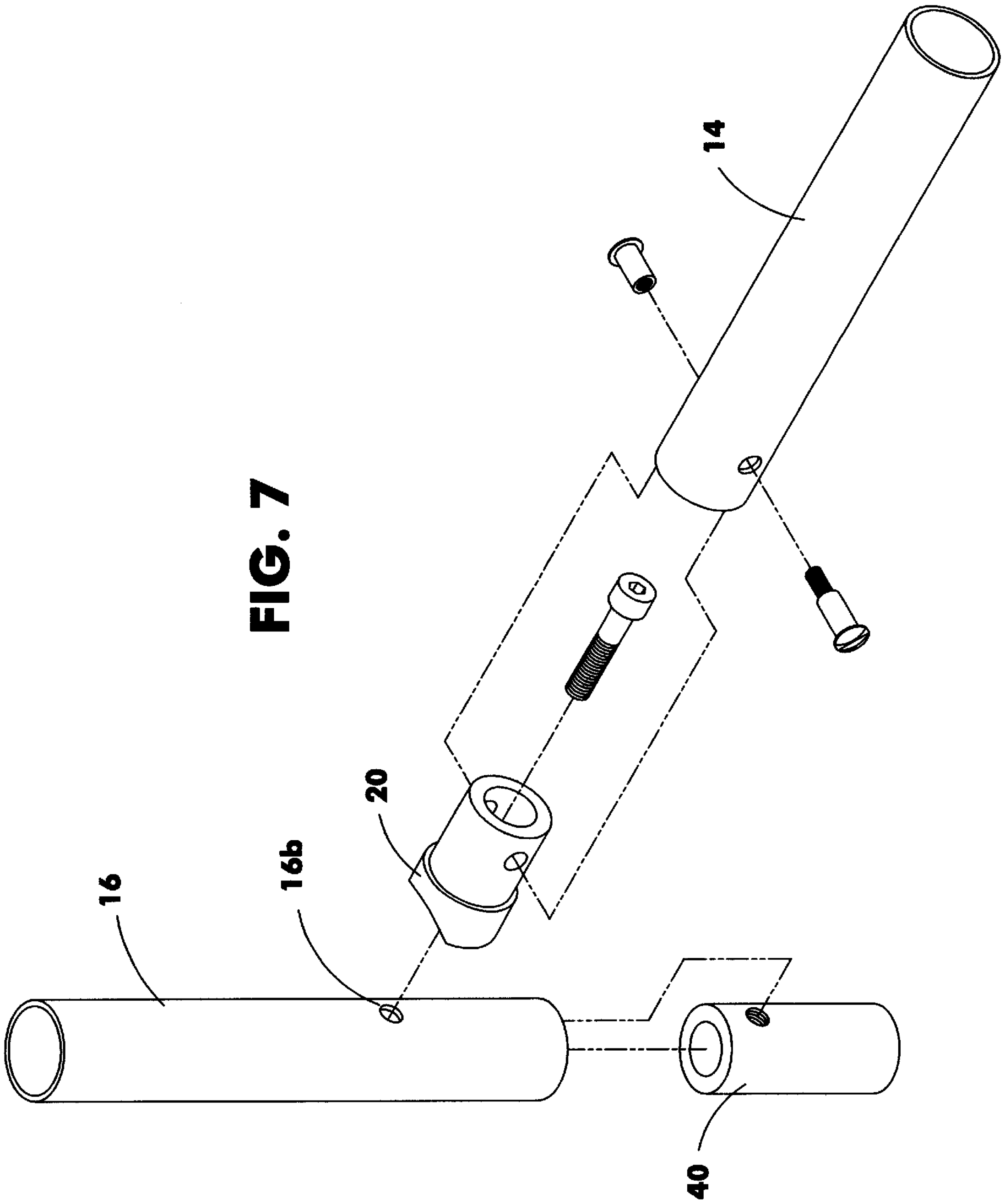
FIG. 7 is a fragmentary, exploded perspective view of the connector fitting used in the wheelchair shown in FIGS. 1–6.

Now referring to FIGS. 4, 5 and 6, a rigid wheelchair in accordance with the present invention is generally designated by the reference numeral 110.

The wheelchair 110 has a pair of like side frame assemblies 120 spaced from each other and including the same components as the previous folding wheelchair side frame assemblies, upper tube 14, lower tube 16 and connector fittings 20. To convert the folding wheelchair 10 to a rigid wheelchair 110, the following components are removed from the folding wheelchair: seat upholstery 76, crossbar assemblies 22 (including crossbar tubes 24, seat tube 26 and tee fitting 30, see FIG. 1,2 and 3), crossbar links 34, seat tube saddles 36 and retaining rings 32. The insert tubes 28 in the seat tubes are removed and reinstalled in the top tube 14 of the rigid side frame assemblies 120. The upper frame tubes 14 and lower frame tubes 16 mount to one another with connector fittings 20 at the front at 14*a* and 16*a* and at the rear at 14*b* and 16*c*. This allows the top frame 14 to at the same seat height from the floor as the seat tube 26 on the folding frame wheelchair 10. Threaded inserts 122 are installed into the lower frame tubes 16 at holes 16*d* aligning holes. Straight crossbar tubes 124 are installed at the holes 16*d* and 16*e* with the special connector fittings and screws. Formed cross tubes 126 are installed on the upper frame tubes 14 at 14*d* and 14*e* using special connector fittings and screws. The insert 28 has corresponding threaded holes to 14*d* and 14*e* to which the formed cross tubes 126 are attached. An additional formed cross tube 126 is attached to the push handle tubes 38 at 38*b* using special fittings 20 and screws.

An optional folding back assembly 130 may be attached to the rigid frame wheelchair 110. The push handle tubes 38*a* are removed from the side frame assembly 120 by removing the screws at 38*a*. The back insert 40 is removed and replaced with a new insert 128. Insert 134 is added to the bottom of each push handle 38 at holes 38*a*. Screws are used to attach back hinge plates 132 to the push handles at 38*a* and to the top frame tube 14 at 14*f*. A removable pin through the hinge plates 132 and the top of the lower frame tube 16*b* at hole 16*f*.

The footrest assembly 52 or 66 are the same as those used on the folding frame wheelchair 10 or an optional rigid footrest assembly 134' may be used on the rigid frame wheelchair 110. This assembly consists of a generally u-shaped tubular footrest tube 136. Each parallel leg 136*a* and 136*b* of the footrest tube has a series of holes through both walls of the tube. Each of the parallel legs are telescopically received within the front ends 14*a* of the top frame tubes 14, as shown. A footrest 60 is secured to the horizontal potion of the u-shaped footrest tube 136 by means of footrest clamps 62. A belt or strap 64 extends between opposing parallel legs of the footrest tube 136 and is positioned above the footrest 60 to serve as a foot support and to prevent the legs from slipping rearwardly off of the footrest.

The above mentioned procedure is to convert a folding wheelchair 10 into a rigid frame wheelchair 110. The reverse procedure would be used to convert rigid to folding.

All frame components are designed to accept parts for both the folding 10 and rigid frame 110 wheelchairs. Tubular components are designed to be easily attached to other members with the special connector fittings 20.

This design offers a simple, durable, lightweight, affordable wheelchair. It can be quickly and easily converted from a folding to a rigid frame wheelchair and vice versa. The design has the following features:

1. A simple and unique method of conversion;
2. Modular construction;
3. No welded or brazed joints;
4. Lightweight construction; and
5. Ability to adapt to any end user's needs.

While this invention has been described in detail with particular reference to preferred embodiments thereof, it will be understood that variations and modifications will be effected within the spirit and scope of the invention as described herein and as defined in the appended claims.

What is claimed is:

1. A modular convertible wheelchair comprising:

(a) a pair of like side frame assemblies spaced from each other and each including a generally horizontal seat tube, a generally horizontal bottom tube below said seat tube, each of said seat and bottom tubes having front and rear ends; and a generally vertical backrest tube having a lower end proximate to said rear ends of said seat and bottom tubes and an upper end extending upwardly of said seat tube and forming handgrips;

(b) a caster assembly for each side frame assembly carrying a caster wheel;

(c) footrest support means secured to said seat tube;

(d) plural transverse tube means extending between said side frame assemblies;

(e) wherein the improvement comprises an interchangeable conversion kit including pivotally connected elongate means having ends pivotably connectable to said side frame assemblies to replace said transverse tube means thereby selectively and reversibly converting said wheelchair to a folding frame wheelchair; and (f) weld-free connecting means for rigidly connecting respective rear ends of said seat and bottom tubes and lower ends of said backrest tubes, for rigidly connecting respective front ends of said seat and bottom tubes, and for rigidly connecting said conversion kit to said side frame assemblies.

2. A wheelchair as defined in claim 1, wherein the wheelchair can be converted to a sports wheelchair.

3. A wheelchair as defined in claim 1, wherein the wheelchair can be converted to a companion wheelchair.

4. A wheelchair as defined in claim 1, wherein the wheelchair can be converted to a pediatric wheelchair.

5. A modular convertible wheelchair comprising:

(a) a pair of like side frame assemblies spaced from each other and each including a generally horizontal seat tube; a generally horizontal bottom tube below said seat tube, each of said seat and bottom tubes having front and rear ends; and a generally vertical backrest tube having a lower end proximate to said rear ends of said seat and bottom tubes and an upper end extending upwardly of said seat tube and forming handgrips;

(b) a caster assembly for each side frame assembly carrying a caster wheel;

(c) weld-free connecting means for rigidly connecting respective rear ends of said seat and bottom tubes and lower ends of said backrest tubes, for rigidly connecting respective front ends of said seat and bottom tubes;

(d) footrest support means secured to said tube;

(e) a plurality of transverse tube means having ends and extending between said side frame assemblies to form a rigid frame wheelchair;

(f) rear wheels mounted on said frame assemblies; and wherein the improvement comprises (g) a conversion kit comprising pivotally connected elongate means having ends pivotably connectable to said side frame assemblies for selectively replacing said transverse tube means to form a folding frame wheelchair and for permitting said side frame assembly to move from the width position of the wheelchair to proximate positions in the collapsed condition of the wheelchair.

6. A modular convertible wheelchair comprising:

(a) a pair of like side frame assemblies spaced from each other and each including a generally horizontal seat tube; a generally horizontal bottom tube below said seat tube, each of said seat and bottom tubes having front and rear ends; and a generally vertical backrest tube having a lower end proximate to said rear ends of said seat and bottom tubes and an upper end extending upwardly of said seat tube and forming handgrips;

(b) a caster assembly for each side frame assembly carrying a caster wheel;

(c) weld-free connector means for each of said side frame assemblies for rigidly connecting respective rear ends of said seat and bottom tubes and lower ends of said backrest tubes, for rigidly connecting respective front ends of said seat and bottom tubes, and for rigidly connecting said conversion means to frame assemblies;

(d) footrest support means secured to said seat tube;

(e) rear wheels mounted on said side frame assemblies; and wherein the improvement comprises (f) a kit comprising of at least two transverse members including at least two elongate rigid tubes having a length substantially corresponding to the normal operative width of the wheelchair and at least one set of pivotably connected members that can pivot relative to each other, said at least two transverse members being selectively used to convert from a rigid frame wheelchair to a folding frame wheelchair.

* * * * *